Dec. 11, 1923.
A. C. CULVER
1,477,039
DIRECT DRIVE DIFFERENTIAL
Filed April 30, 1923
4 Sheets-Sheet 1
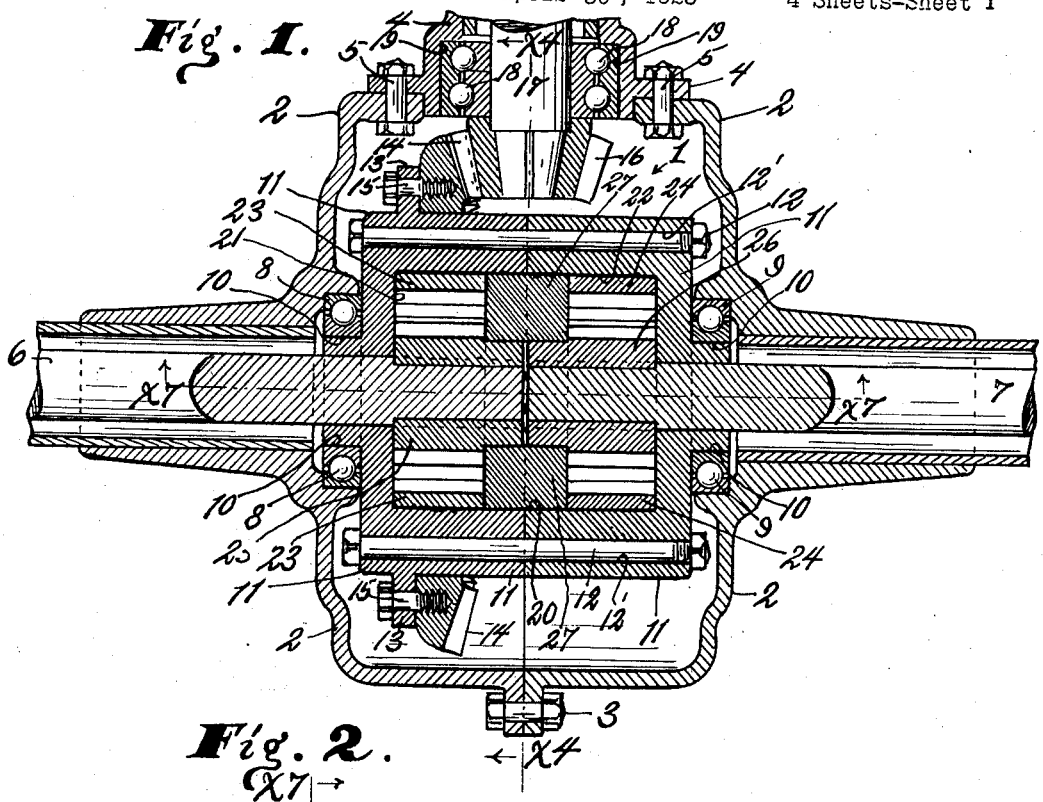
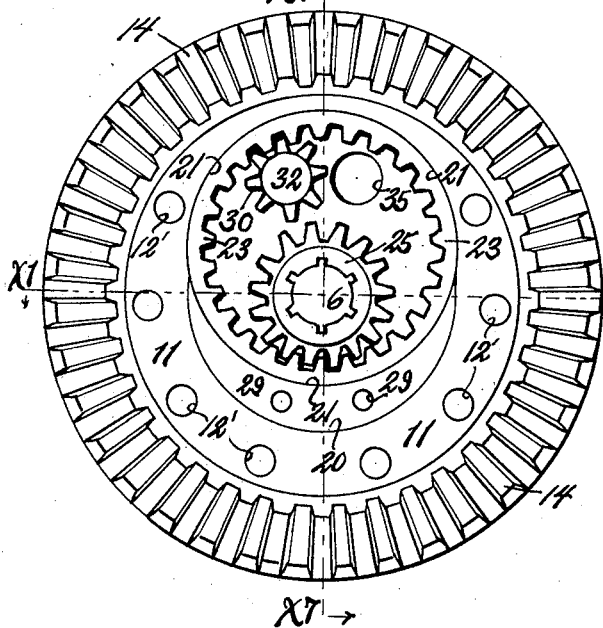
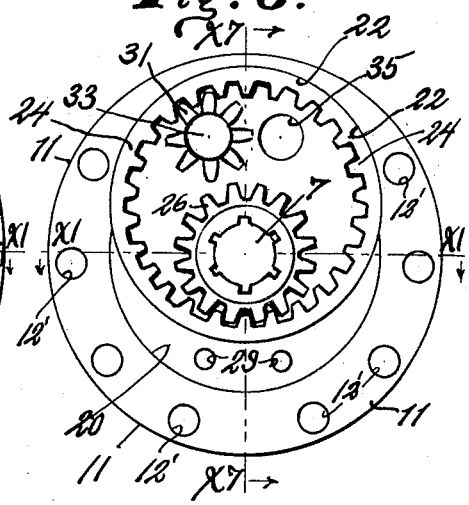
Witness:
W. M. Gentle.
Inventor.
Arthur C. Culver.
by James R. Townsend
his atty Dec. 11, 1923.
A. C. CULVER
DIRECT DRIVE DIFFERENTIAL
Filed April 30, 1923
1,477,039
4 Sheets-Sheet 2
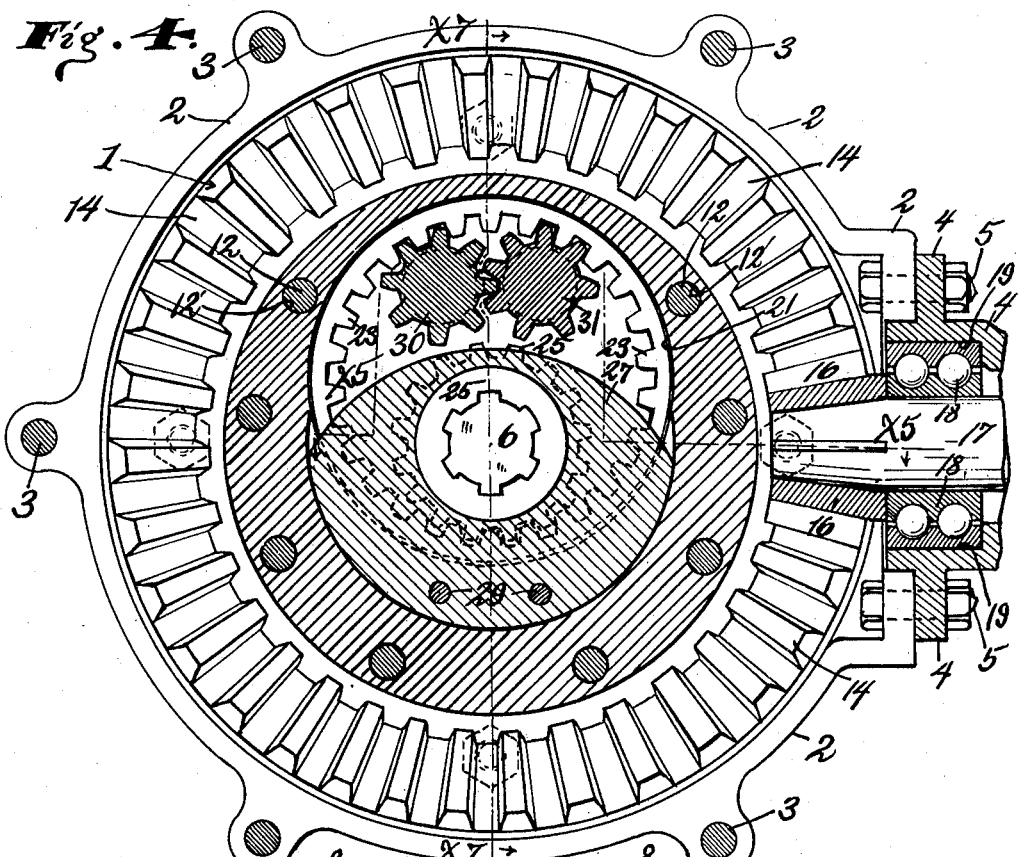
Fig. 4.
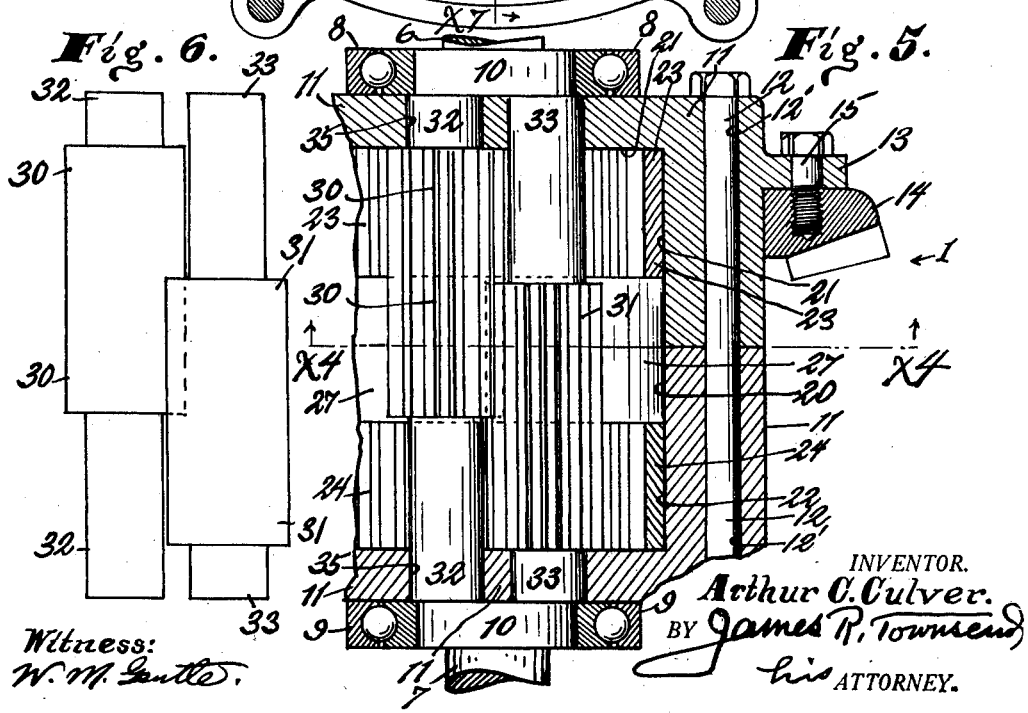
Fig. 6.
Fig. 5.
Witness:
W. M. Gentle.
INVENTOR.
Arthur C. Culver.
BY James R. Townsend
his ATTORNEY.

Dec. 11, 1923.
A. C. CULVER
1,477,039
DIRECT DRIVE DIFFERENTIAL
Filed April 30, 1923    4 Sheets-Sheet 3
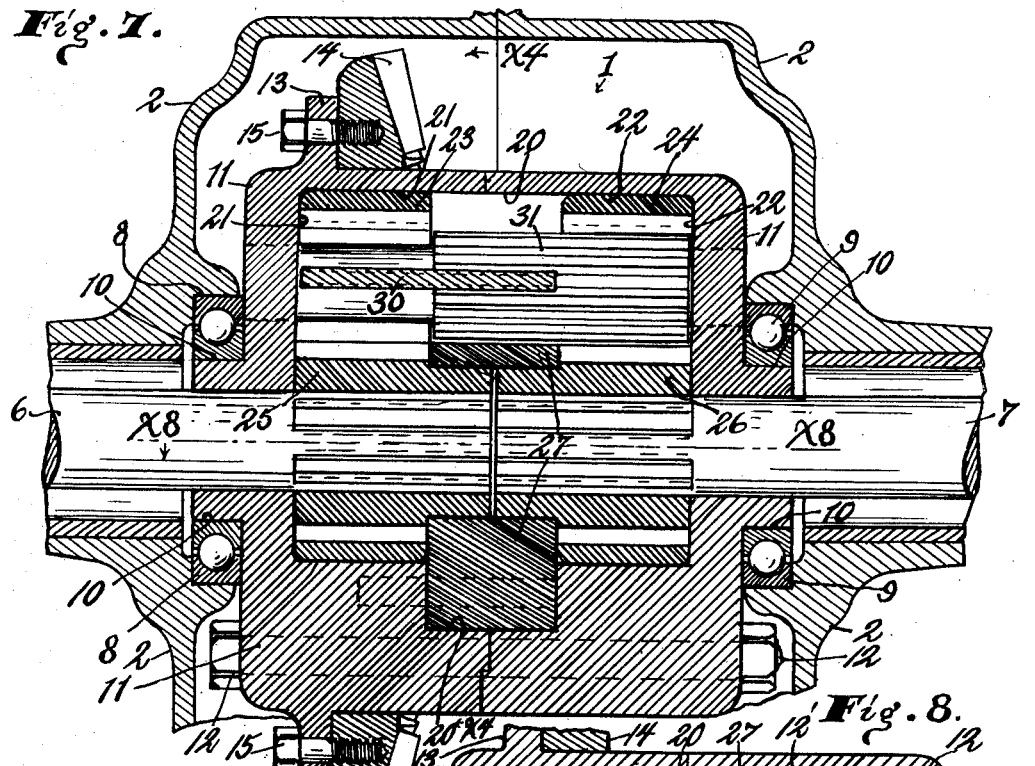
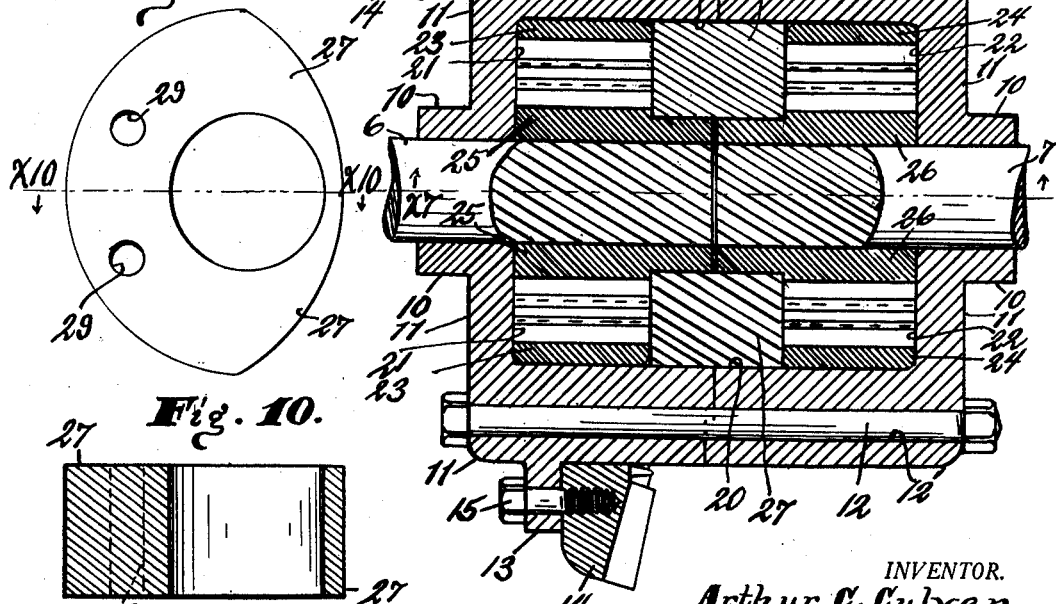
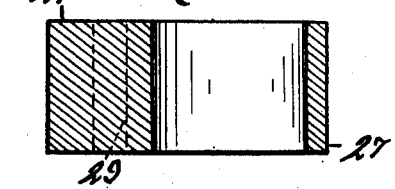
Witness:
W. M. Gentle.
INVENTOR.
Arthur C. Culver.
BY James R. Townsend
his ATTORNEY.

Dec. 11, 1923.
A. C. CULVER
1,477,039
DIRECT DRIVE DIFFERENTIAL
Filed April 30, 1923    4 Sheets-Sheet 4
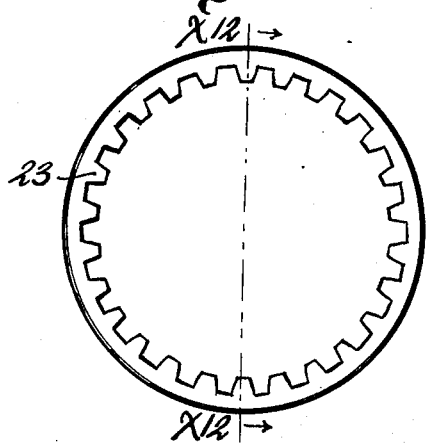
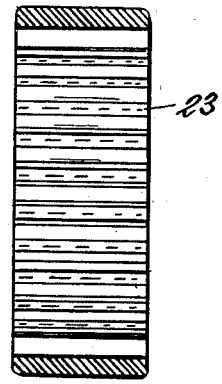
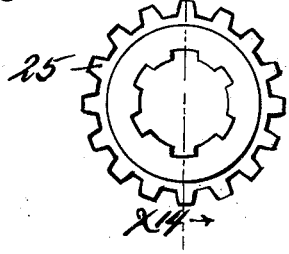
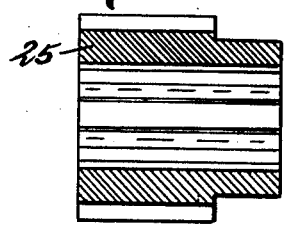
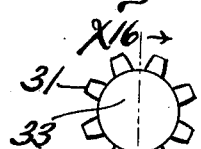
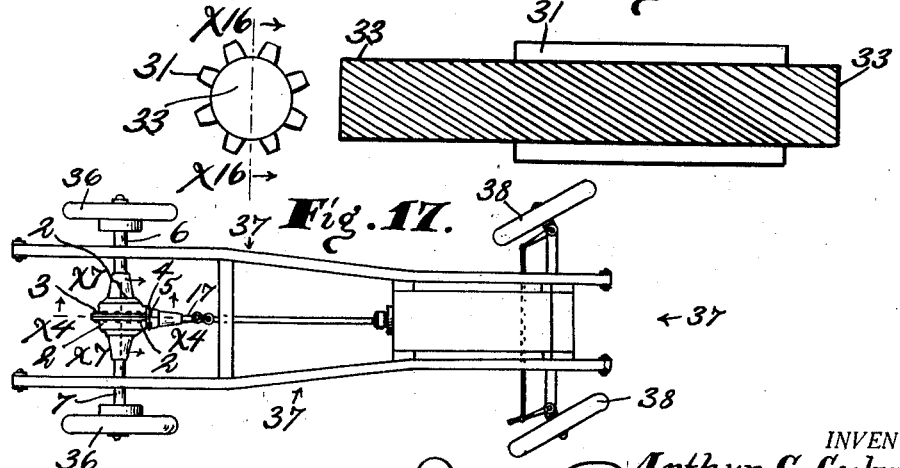
INVENTOR.
Arthur C. Culver
BY Townsend
his ATTORNEY.
Witness:
W. M. Gentle.

Patented Dec. 11, 1923.

1,477,039

UNITED STATES PATENT OFFICE.

ARTHUR C. CULVER, OF PASADENA, CALIFORNIA.

DIRECT-DRIVE DIFFERENTIAL.

Application filed April 30, 1923. Serial No. 635,669.

*To all whom it may concern:*

Be it known that I, ARTHUR C. CULVER, a citizen of the United States, residing at Pasadena, in the county of Los Angeles and State of California, have invented a new and useful Direct-Drive Differential, of which the following is a specification.

This invention relates to means for compensating for the difference of speed between two driving ground wheels of an automotive vehicle and an object of the invention is to provide a simple and effective means for accomplishing that purpose, and furthermore, to positively drive both wheels equally irrespective of whether both or only one of such wheels is on the ground. Heretofore, when either one of two differentially driven wheels is lifted from the ground, or sinks into sand or into mud or soft ground while the other is on solid ground, power applied through the differential operates to spin the wheel that does not rest on solid ground, while the other wheel stands still.

An object is to avoid this and to invariably drive both wheels with the same speed and power under all conditions of road and direction, with the single exception that either wheel is free to be revolved at a higher speed than the other by power applied by hand or other means independently of the differential gearing, in the same direction as that in which the differential gear is operating to turn it.

An object is to provide a direct drive differential; that is, a drive in which the power is directly transmitted from the power shaft to the driven axles.

The invention is broadly new, basic, pioneer and primary in that I employ in combination with a differential carrier that is concentric to the driven axles, two co-axial floating annular gears of like radius journaled to the carrier excentric to and encircling the axis of the carrier, and provide the driven axles with pinions that mesh with the annular gears, respectively; and connect the internal gears and carrier together by two planetary pinions which are journaled to the carrier, are geared together, and are respectively geared to said annular gears.

Other objects are simplicity, cheapness, lightness, strength, reduced friction, and ease of assembly.

An advantage gained by this invention is the increased certainty of propulsion.

A feature of the invention is the combination with a differential carrier and abutting axles; of concentric internal gears journaled eccentrically of the axles and means whereby said internal gears operate as eccentrics between the power shaft and the axles to positively drive both shafts and at the same time allow an adjustment to take place between the two revolving axles when the rotation of both axles is resisted; resolution of the force applied to revolve the axles being automatically effected to cause the rotations of the respective axles to correspond to the respective resistances to such rotations.

An object of the invention is to make provision whereby the differential mechanism only operates when there are different resistances upon the two axles; and an advantage arising from this construction is that when it is desired to utilize the power of the motor to drive machinery from the rear axle of an automotive vehicle; by lifting both of the drive wheels off of the ground, either axle is adapted to transmit power by means of a belt, cable, or sprocket wheel or any desired means of transmission driven by either one of the axles and the power will be applied without relative displacement of the parts of the differential.

An object of this invention is to provide a differential adapted to positively transmit power to each of two axles or shafts in either direction irrespective of the other axle or shaft so that the load may be carried by either or both axles according to the circumstances that may prevail, and yet either axle is free for extra advance movement such as is necessary to accommodate the outer driving wheel of an automobile in rounding a curve.

Other objects, advantages and features of invention may appear from the accompanying drawings, the subjoined detail description and the appended claims.

The accompanying drawings illustrate the invention.

Figure 1 is a fragmental central longitudinal section through a differential constructed in accordance with this invention.

Fig. 2 is an end view of the left hand axle and associated parts shown in Fig. 1 detached from the casing.

Fig. 3 is an end view of the right hand axle and associated parts in the position they would occupy if lifted off the parts in Fig. 2, and turned over to show the gears inside.

Fig. 4 is an enlarged fragmental vertical section on line $x^4$, Figs. 1, 5, 7 and 17.

Fig. 5 is a fragmental section on staggered line $x^5$, Fig. 4. Parts are omitted for the sake of clearness.

Fig. 6 is a diagrammatic view of the interlocking pinions that are shown in detail in Fig. 5.

Fig. 7 is a fragmental section on line $x^7$, Figs. 1, 4 and 17.

Fig. 8 is a fragmental section on line $x^8$, Fig. 7, detached from the casing.

Fig. 9 is a side view of a bearing block for the axle gears.

Fig. 10 is a section on line $x^{10}$, Fig. 9.

Fig. 11 is a side view of one of the floating or annular gears.

Fig. 12 is a section on line $x^{12}$, Fig. 11.

Fig. 13 is an end view of an axle gear.

Fig. 14 is a section on line $x^{14}$, Fig. 13.

Fig. 15 is an end view of one of the planetary locking pinions.

Fig. 16 is a section on line $x^{16}$, Fig. 15.

Fig. 17 is a plan view of a differential embodying this invention in place on an automobile turning a corner.

The differential 1 is mounted in a split housing 2 that has its halves secured together by the bolts 3, end plate 4 and bolts 5, and extending co-axially into the housing; and abutted end to end are the right and left hand axles 6, 7, that are supported by the ball bearings 8, 9, interposed between the walls of the housing 2 and hubs 10 of the split differential carrier 11, the halves of which are secured together by bolts 12 that extend through suitable openings 12'.

The differential carrier 11 is provided with a concentric flange 13 to which a bevel ring gear 14 is secured by screws 15; and meshing with the gear 14 is a drive gear 16 on the drive shaft 17 that has one end supported in the ball bearing 18 mounted in a recess 19 of the end plate 4.

The carrier 11 is provided with a recess 20 that is extended in opposite directions and parallel to the axis of the axles 6, 7 to form right and left hand journal bearings 21, 22 for the annular gears 23, 24; said bearing recesses 21, 22 are co-axial to each other and eccentric to the carrier; and these gears are arranged so that a portion of their teeth are always in mesh with the respective axle pinions 25, 26.

A block 27 is fitted into the recess 20, and it extends around and forms a bearing support for the hub portions of the gears 25, 26; and this block is secured to the carrier 11 by the pins 28 that extend into holes 29, so that the block rotates with the carrier, but is constructed and arranged so that the axle pinions 25, 26 can move independently of the carrier.

Arranged oppositely to the block 27 are the planetary locking pinions 30, 31 that have their hub ends 32, 33 journaled into the openings 35 of the carrier 11; and these pinions are constructed so that their teeth mesh a distance substantially the length of the block 27.

The teeth of pinion 30 are extended out of mesh with the teeth of pinion 31 and into mesh with a portion of the teeth of the annular internal gear 23; and the teeth of pinion 31 are extended out of mesh with the teeth of pinion 30 to engage a portion of the teeth of the annular internal gear 24; by which construction and arrangement of the parts the teeth of pinion 30 are in driving connection with the axle pinion 25 by the annular gear 23; and pinion 31 with the axle pinion 26 by the annular gear 24 so that when the carrier 11 is rotated, the inter-locking teeth of the gears and planetary locking pinions, form a direct driving connection between the drive shaft 17 and the axles 6, 7; and by which construction and arrangement of the parts, the differential will compensate for a change of speed of either axle. In practical operation, when power is applied from the engine to drive the differential, if one of the wheels is on the ground and the other is off the ground, the wheel that is off the ground will spin; but if the slightest friction is applied to such spinning wheel, the power will operate to overcome such friction; and when both the wheels are on the ground, and power is applied to the differential, it will drive both wheels differentially and appropriately; each wheel being free to make any gain or loss determined by turns or road conditions. In other words while the load bearing wheels are on the ground, either of the axles can be made to retard or increase its speed to consummate a turn of the vehicle; but at no time while the loaded wheels are on the ground, can either of the axles make a complete revolution in advance of the other when the carrier is driven, but either can move differentially of the other when the carrier is idle.

In practical operation when both drive wheels 36 of the automotive vehicle 37 are on the ground and the guide wheels 38 are turned so that one of the drive wheels must travel faster than the other, the differential gear will respond to the different speeds required of the two drive wheels; the greater resistance imposed upon the wheel traveling on the shorter radius causes said wheel to form a fulcrum on which the two axles swing from moment to moment until the wheel on the outer axle finds a resistance by ground contact; and this adjustment continues from moment to moment while the wheels are driven to turn the vehicle.

I claim:

1. The combination with two axles; of a differential carrier concentric to said axles; two co-axial floating internal gears journaled to said carrier eccentrically thereof and encircling the axis of the carrier; pinions fixed on the axles respectively and meshing respectively with said floating internal gears; two planetary pinions journaled to the carrier and meshing with each other, one of said planetary pinions meshing with one of said internal gears and the other planetary pinion meshing with the other internal gear.

2. A direct drive differential comprising a housing; a rotary carrier mounted in said housing said carrier having therein co-axial recesses eccentric thereto; annular gears journaled in the recesses of said carrier; axles extending into said housing and carrier; a drive shaft for rotating said carrier; planetary pinions movable with said carrier and engaging said annular gears; and a driving connection between said annular gears and axles.

3. A direct drive differential comprising a housing; a rotary carrier mounted in said housing, said carrier having co-axial recesses eccentric thereto; annular gears in the recesses of said carrier, said gears movable independently of one another; a drive shaft for rotating said carrier; meshing planetary pinions movable with said carrier and engaging said annular gears; axles extending into said housing and carrier; and pinions on said axles that engage said annular gears.

4. A direct drive differential comprising a housing; a rotary carrier mounted in said housing, said carrier having right and left hand coaxial recesses therein; right and left hand annular gears mounted in their respective recesses of said carrier; right and left hand planetary pinions carried by said carrier and engaging their respective annular gears and said pinion arranged to mesh; right and left hand axles extending into said casing and carrier; a driving connection between said axles and their respective annular gears; and means for rotating said carrier.

5. A direct drive differential comprising a housing; a rotary carrier mounted in said housing said carrier having right and left hand co-axial recesses therein; right and left hand annular gears mounted in their respective recesses of said carrier; right and left hand planetary pinions carried by said carrier and engaging their respective annular gears and said pinion arranged to mesh; right and left hand axles extending into said housing and carrier; a driving connection between said axles and their respective annular gears; a bevel ring gear secured to said carrier; and means for rotating said bevel ring gear.

6. A direct drive differential comprising a housing; a rotary carrier mounted in said housing, said carrier having right and left hand co-axial recesses therein; right and left hand annular gears mounted in their respective recesses of said carrier; right and left hand planetary pinions carried by said carrier and engaging their respective annular gears and said pinions arranged to mesh; right and left hand axles extending into said casing and carrier; a driving connection between said axles and their respective annular gears; a concentric flange on said carrier; a bevel ring gear secured to said flange; and a drive shaft for actuating said ring gear to rotate said axles.

In testimony whereof, I have hereunto set my hand at Los Angeles, California, this 19th day of April, 1923.

ARTHUR C. CULVER.

Witness:
JAMES R. TOWNSEND.